(No Model.)
H. MOLCHIOR.
SCRAPER.
No. 510,986. Patented Dec. 19, 1893.
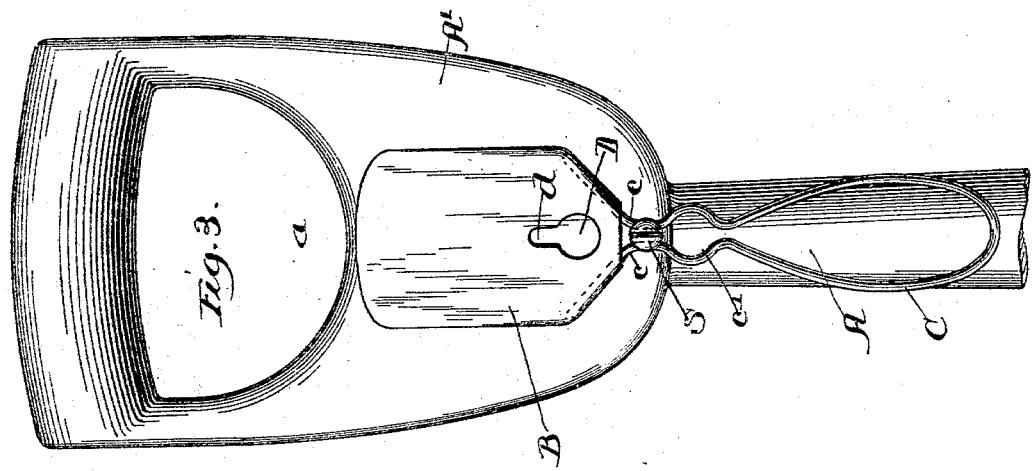
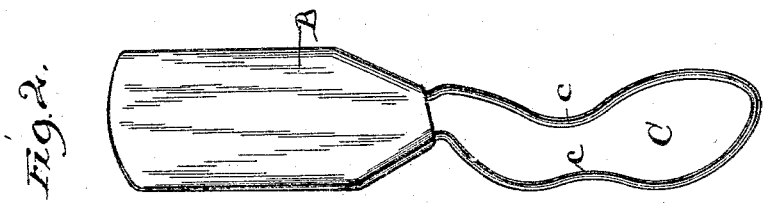
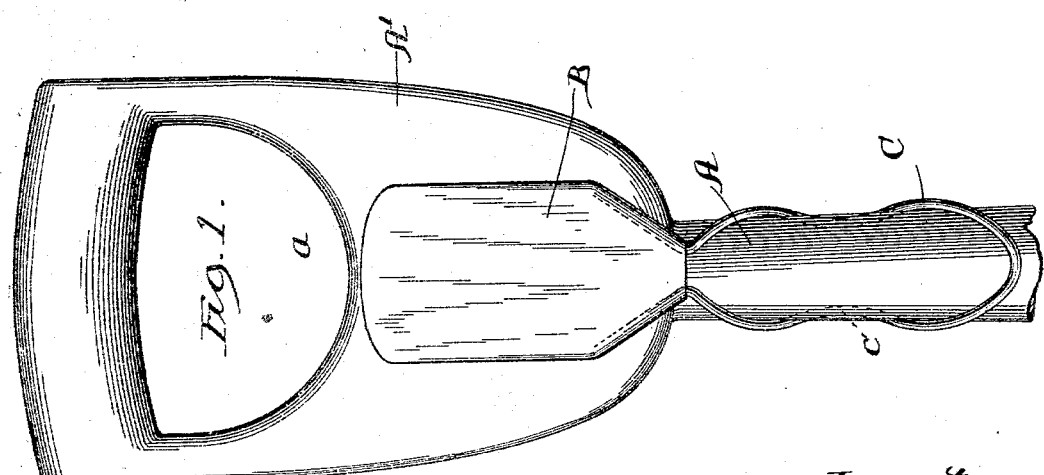
Witnesses:
Charles O. Shewey
A. J. H. Ebbesen
Inventor:
Herman Molchior
by Niles, Gorne & Pitman
Attorneys.

UNITED STATES PATENT OFFICE.

HERMAN MOLCHIOR, OF FREEPORT, ILLINOIS, ASSIGNOR OF ONE-HALF TO ALBERT BAUMGARTEN, OF SAME PLACE.

SCRAPER.

SPECIFICATION forming part of Letters Patent No. 510,986, dated December 19, 1893.

Application filed February 24, 1893. Serial No. 463,532. (No model.)

*To all whom it may concern:*

Be it known that I, HERMAN MOLCHIOR, a citizen of the United States of America, residing at Freeport, in the county of Stephenson and State of Illinois, have invented certain new and useful Improvements in Scrapers, of which the following is a specification.

My invention relates to improvements in scrapers adapted to be used for cleaning shovels, spades, and other implements used in excavating, the object of the invention being to provide a cheap, simple and effective tool which can readily be secured to and removed from the implement on which it is to be used.

The invention is fully described and explained in this specification and shown in the accompanying drawings, in which—

Figure 1 is a front elevation of the upper portion of a shovel handle provided with a scraper embodying my invention. Fig. 2 is a perspective view of the scraper; and Fig. 3 is a front elevation of the upper portion of a shovel handle provided with a modified form of my scraper.

In Figs. 1 and 2, A is the upper part of a shovel handle of ordinary construction provided at its upper end with the usual flat enlargement, A', and hand-hole, a. B is the flat blade of my improved scraper, and C is a handle formed of a single piece of wire having its ends secured to the blade, B, by bending the edges of the latter over the ends of the wire. The handle is in the form of a closed loop whose sides are symmetrical, and each of the sides is formed near its middle with a forward and inward curve, c, these two curves being so placed that when the handle, C, is applied to an approximately cylindrical body of suitable diameter, like the handle, A, of the shovel, the two sides clasp the handle firmly, and the curves, c, c, at their centers pass beyond the central plane of the cylinder, thus preventing accidental escape of the handle, C, from the body to which it is attached. The handle of the scraper may be attached to and detached from the handle, A, by pressure at right angles to the handle, A, but I have found it preferable to apply the handle of the scraper to the shovel handle at the extreme upper end of the latter, where its diameter is substantially the same as the distance between the bends c, c, of the handle, C. From this point the scraper may be slipped downward and as the shovel handle increases in diameter from top to bottom, the scraper soon reaches a point where its handle clasps the shovel handle firmly, so that the entire device is held securely in place.

Fig. 3 shows a slightly different form of the device in which the looped handle, C, instead of clasping the shovel handle, is formed with two opposite bends, c, c, so near together as to clasp the shank of a screw, S, set in the shovel handle, the two sides of the wire handle, C, being sufficiently separated at a point immediately below the bends, c, c, to form an opening, c', adapted to pass freely over the screw-head. This form of the scraper may evidently be easily attached to or detached from the screw, S, and when attached thereto is held firmly in place.

The use of the two forms of the scrapers and of other forms which might be suggested is evidently the same, each of the forms being intended for cleaning the shovel or other implement with which it is used and to which it is attached when not in actual use.

Instead of attaching the scraper to the screw, S, by means of the bends in its handle, the blade may be provided with an opening, D, of sufficient diameter to pass over the screw-head, this opening being formed with a slot, d, in its margin adapted to slide down upon the shank and embrace it for the purpose of holding the device in place.

Having now described and explained my invention, what I claim as new, and desire to secure by Letters Patent, is—

1. A scraper made up of a suitable blade and a wire handle attached to the blade and formed with bends adapted to clasp an implement handle and to thereby secure the scraper detachably thereto; substantially as shown and described.

2. A scraper made up of a blade, B, and a wire handle, C, attached to the blade and formed with bends, c, c, adapted to clasp the handle of an implement and to secure the scraper detachably thereto; substantially as shown and described.

HERMAN MOLCHIOR.

Witnesses:
A. T. GREEN,
CHARLES T. GREEN.